(12) United States Patent
Garcia Gomez et al.

(10) Patent No.: US 10,315,600 B2
(45) Date of Patent: Jun. 11, 2019

(54) METHOD FOR OPERATING A SAFETY SYSTEM OF A MOTOR VEHICLE IN THE EVENT OF A COLLISION AND MOTOR VEHICLE

(71) Applicant: AUDI AG, Ingolstadt (DE)

(72) Inventors: Raul Garcia Gomez, Ingolstadt (DE); Markus Geiss, Möttingen (DE)

(73) Assignee: AUDI AG, Ingolstadt (DE)

( * ) Notice: Subject to any disclaimer, the term of this patent is extended or adjusted under 35 U.S.C. 154(b) by 92 days.

(21) Appl. No.: 15/317,710

(22) PCT Filed: Feb. 11, 2015

(86) PCT No.: PCT/EP2015/000299
§ 371 (c)(1),
(2) Date: Dec. 9, 2016

(87) PCT Pub. No.: WO2015/188900
PCT Pub. Date: Dec. 17, 2015

(65) Prior Publication Data
US 2017/0120851 A1     May 4, 2017

(30) Foreign Application Priority Data
Jun. 12, 2014   (DE) .......................... 10 2014 008 744

(51) Int. Cl.
*B60R 21/01* (2006.01)
*B60R 21/0136* (2006.01)
(Continued)

(52) U.S. Cl.
CPC ...... *B60R 21/0136* (2013.01); *B60R 21/0132* (2013.01); *B60R 21/01542* (2014.10);
(Continued)

(58) Field of Classification Search
CPC .................................................. B60R 21/0136
See application file for complete search history.

(56) References Cited

U.S. PATENT DOCUMENTS

| 4,985,835 | A | 1/1991 | Sterler et al. |
| 5,629,847 | A | 5/1997 | Shirakawa et al. |

(Continued)

FOREIGN PATENT DOCUMENTS

| DE | 38 03 426 A1 | 8/1989 |
| DE | 101 26 127 A1 | 2/2002 |

(Continued)

*Primary Examiner* — Hussein Elchanti
*Assistant Examiner* — Michael A Berns
(74) *Attorney, Agent, or Firm* — Seed IP Law Group LLP

(57) ABSTRACT

A method for the operation of a safety system of a motor vehicle in the event of a collision with a collision object, the acceleration of the motor vehicle being recorded by a plurality of collision sensors of the motor vehicle in various sensor data describing directions within the horizontal plane and being evaluated with regard to the triggering and/or an adaptation of an operating parameter as actions of restraint systems for occupants of the motor vehicle, wherein, of the sensor data, two motion values are determined which describe the motion of at least one occupant, especially all occupants, of the motor vehicle along at least one longitudinal direction and at least one transverse direction of the motor vehicle and which span a two-dimensional decision space, the ranges of action assigned to the actions being defined in the decision space and an action being carried out if the point in the decision space described by the motion values is within the range of action assigned to the action.

13 Claims, 3 Drawing Sheets

Figure 1:
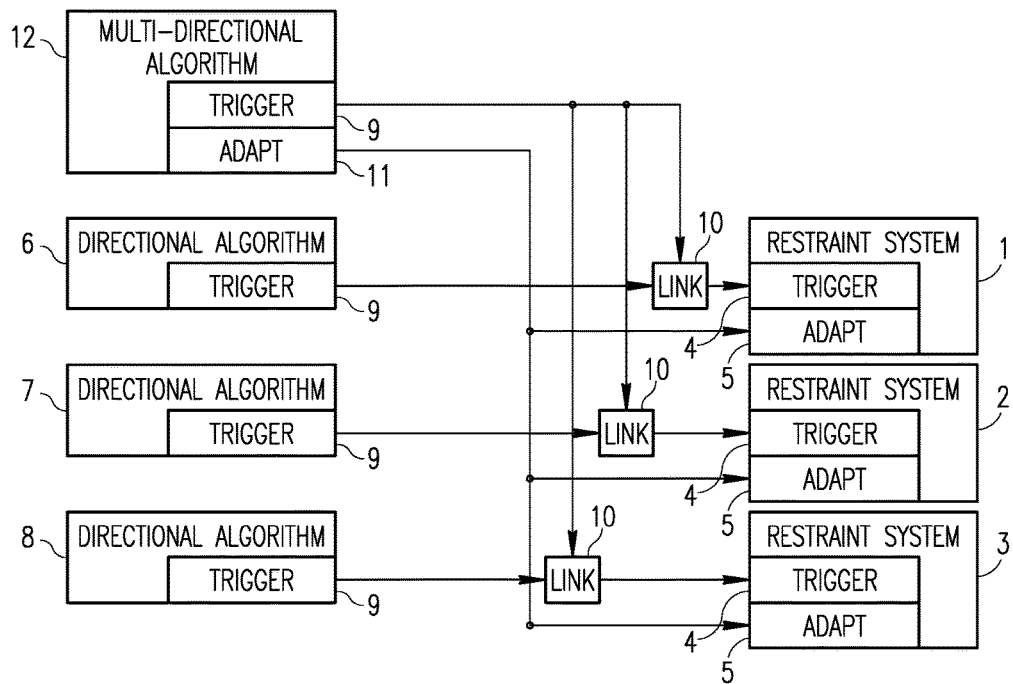

(51) Int. Cl.
 *B60R 21/0132* (2006.01)
 *B60R 21/015* (2006.01)
 *B60R 21/00* (2006.01)

(52) U.S. Cl.
 CPC . *B60R 21/01554* (2014.10); *B60R 2021/0032* (2013.01); *B60R 2021/0102* (2013.01); *B60R 2021/01034* (2013.01); *B60R 2021/01272* (2013.01); *B60R 2021/01286* (2013.01)

(56) References Cited

U.S. PATENT DOCUMENTS

| | | | | |
|---|---|---|---|---|
| 6,256,563 | B1 * | 7/2001 | Blank | B60R 21/0132 180/271 |
| 6,312,013 | B1 * | 11/2001 | Baur | B60R 21/0132 280/735 |
| 6,549,836 | B1 | 4/2003 | Yeh et al. | |
| 6,725,141 | B2 * | 4/2004 | Roelleke | B60R 21/0132 701/45 |
| 7,137,645 | B2 | 11/2006 | Schumacher et al. | |
| 7,321,817 | B2 * | 1/2008 | Prakah-Asante | B60R 21/013 180/271 |
| 7,376,502 | B2 * | 5/2008 | Theisen | B60R 21/0132 180/274 |
| 7,502,677 | B2 | 3/2009 | Weichenberger et al. | |
| 8,442,723 | B2 | 5/2013 | Koehler et al. | |
| 9,855,908 | B2 * | 1/2018 | Cooper | B60R 21/01554 |
| 2002/0013649 | A1 * | 1/2002 | Anishetty | B60R 21/013 701/45 |
| 2006/0095183 | A1 * | 5/2006 | Schuller | B60R 21/013 701/45 |
| 2007/0114769 | A1 | 5/2007 | Ogata | |

FOREIGN PATENT DOCUMENTS

| | | |
|---|---|---|
| DE | 100 57 916 C2 | 4/2003 |
| DE | 103 60 893 A1 | 7/2005 |
| DE | 10 2004 031 557 A1 | 2/2006 |
| DE | 10 2008 040 591 A1 | 1/2010 |
| GB | 2 281 798 A | 3/1995 |
| WO | 00/35716 A1 | 6/2000 |

* cited by examiner

METHOD FOR OPERATING A SAFETY SYSTEM OF A MOTOR VEHICLE IN THE EVENT OF A COLLISION AND MOTOR VEHICLE

The invention relates to a method for the operation of a safety system of a motor vehicle in the event of a collision with a collision object, the acceleration of the motor vehicle being recorded by a plurality of collision sensors of the motor vehicle in various sensor data describing directions within the horizontal plane and being evaluated with regard to the triggering and/or an adaptation of an operating parameter as actions of restraint systems for occupants of the motor vehicle. In addition, the invention relates to a motor vehicle.

Safety systems for motor vehicles that control occupant restraint systems (often abbreviated RHS [in German]), for example, airbags and seat-belt tensioners are already known in the art. In order to develop algorithms that control the operation of the restraint systems in reaction to incoming sensor data, standardized crash tests are typically run, a distinction being made between front, side and rear-end collisions. Accordingly, algorithms are implemented for the different sides of the motor vehicle for which tests were performed and at which the collision could occur, in particular a front-end collision algorithm, a side collision algorithm and a rear collision algorithm.

These algorithms, which are related to specific algorithms and can also be characterized as directional algorithms, are not only able to make decisions about the triggering of a restraint system, but can also be adjusted to adapt the restraint action to the particular collision. Therefore, many restraint systems can be divided into actuators, such as a pyrotechnic seat-belt tensioner, an airbag detonating pellet and the like, and adaptations, such as belt force limiter, airbag valves and the like.

The problem with this approach, which is focused on directions, is that new knowledge from traffic accident research and resulting simulations show that a clear differentiation of a direction of a collision frequently is not possible, which means it can scarcely be decided whether it is a front-end collision, side collision or a rear-end collision. Due to the existing rigid assignment of restraint systems to the corresponding front-end collision, side collision and rear-end collision algorithms, that is the directional algorithms, there is not always an optimum control in the field if the collision actually occurring cannot be assigned to a unique direction.

The object of the invention is therefore to specify an optimum control of restraint systems in situations in which there is no distinct front-end collision, side collision or rear-end collision.

To achieve this object, it is provided according to the invention in a method of the type mentioned at the outset that, of the sensor data, two motion values are determined which describe the motion of at least one occupant, especially all occupants, of the motor vehicle along at least one longitudinal direction and at least one transverse direction of the motor vehicle and which span a two-dimensional decision space, the ranges of action assigned to the actions being defined in the decision space and an action being carried out if the point in the decision space described by the motion values is within the range of action assigned to the action.

A motor vehicle usually has a plurality of restraint systems that are assigned to different directions, for example front air bags, side air bags, seat-belt tensioners and the like. The present invention now creates a procedure that can also be characterized as a "multi-directional crash algorithm," and so evaluates any superimposed collision directions, activates appropriate restraining means based on this evaluation and where applicable optimally adapts to the collision. Consequently, as is generally known, the collision sensors provided in the motor vehicle are evaluated in order to filter the sensor data—while using suitable transmission functions—in such a way that motion values are produced that are descriptive for the motion of the occupants in the interior of the motor vehicle so that the appropriate restrain systems are activated in a manner exactly tuned to this motion of the occupants and can also can be adapted where applicable. With regard to the occupants of the vehicle, their motion is ultimately equivalent to the severity of the collision. The motion values that are determined by the transmission functions are related in this context to the longitudinal axis and the transverse axis of the motor vehicle because the restraint systems are also designed to be assigned to these axes, as becomes clear in the example of front airbags and side airbags.

The description of the motion of the occupants in the longitudinal direction and transverse direction of the motor vehicle therefore spans a two-dimensional space, specifically a decision space. The motion values determined from the evaluation of the sensor data may be applied as points for each instant in the two-dimensional decision space in which are appropriately stored, depending on the restraining means, various action thresholds, which delimit the aforementioned ranges of action. The ranges of action in this context are specific or the restraint system and for the action, for example, triggering of a restraint system or adaptation of a restraint system. If in the course of a collision action thresholds are exceeded by the point marked by the motion values (in the temporal progression of a line), and thus it is therefore determined that the point is located within a range of action, the corresponding action for the triggering or adaptation of restraint systems is executed.

Therefore, in this way a method is created that is specifically oriented to the motion of the occupants for which the restraint systems are provided and also can meaningfully analyze collisions not distinctly assigned to one the predefined directions, so that an optimum reaction to collisions on the part of the restraining means can be achieved.

Advantageously, a dual integration of the sensor data describing the acceleration in the longitudinal direction and the transverse direction can be carried out to determine the motion values. Thus, the fundamental connection that exists between the acceleration and the location of an object, in this case an occupant, is used. As a result, the motion values explicitly reflect a motion path of the occupants subject to the accelerations in the longitudinal direction and transverse direction and, therefore, describe the movement path of initially freely movable masses under the effect of the accelerations. In the process, it can specifically be provided that a time window for the integration can be selected in the range from 10 to 100 ms and/or as a function of the current operating state of at least one of the restraint systems. Therefore, if a fast reaction of the restraint system is to occur, there are shorter time windows for the integration in which, however, enough measured values related to the accelerations can be present and can still be smoothed out as required before the integration. In this case, the specific value that is provided for the integration time window can be selected as a function of a current operating state of at least one of the restraint systems. The triggering of the restraint systems should occur specifically on an exceptionally fast time scale, so that shorter time windows can be applied here, for example, in the range of 30 ms. However, if the restraint systems are first triggered and this involves, for example, just the possible adaptation of operating parameters in these restraint systems, for example a valve setting and/or a belt force limitation, a slower reaction to the collision event is also possible, so that longer integration times, for example in the range of 100 ms, can be applied plied in this case. It should be pointed out here that an embodiment of the method according to the invention can generally also be provided to the effect that adaptation actions are only carried out if the assigned restraint system has also been triggered.

However, if the occupants located inside the motor vehicle are not completely freely moving masses, an especially advantageous embodiment of the present invention provides that at least one filter and/or factor describing the effect of objects changing and/or limiting the movement path of occupants, in particular a belt or a seat, is used for the determination of the motion values, in particular following the integration. Belts, seats and/or other components of the motor vehicle impede the free movement of the occupants in the motor vehicle and are expediently also taken into account within the context of the determination of the motion values, wherein, regarding the seats, the seat position determinable, for example, via sensors can also come into play. In this context, it may be provided that filter parameters of the filter and/or the factor from the results of simulations and/or test measurements are determined. This means a substantial component of the transmission functions existing in particular from the integration and a subsequent filtering can be the consideration of restrictions in the movement of the occupants that can be derived, for example, from collision tests and collision simulations.

It should be pointed out again here that motion values assigned to individual occupants can, of course, also be determined, in particular if they are differently impeded in their free movement. Also taken into account then are, of course, the restraint systems assigned in each case for the individual occupants, whose presence, for example, can be determined by a suitable set of interior sensors.

As already indicated, an advantageous embodiment of the present invention provides that when there is an action specifying a triggering of one of the restraint systems, a trigger line delimiting the assigned range of action is used, the triggering of the restraint system occurring when the trigger line is exceeded by the point defined by the motion values that is continuously tracked during the collision. The boundary of the range of action, the trigger line, therefore provides a trigger threshold such that when it is exceeded by the point ultimately tracked in real time, which is formed by the motion values, the action of triggering the corresponding restraint system occurs immediately. In a simple embodiment of this aspect, a straight line can be used as the trigger line, but it is also conceivable, based on further studies for the specific application scenario of detecting more suitable boundaries of the range of action for the triggering of restraint systems.

With regard to the adaptation of operating parameters, it is expedient if, in the case of an action relating to an adaptation of an operating parameter of one of the restraint systems, the intensity of the adaptation is determined as a function of at least one distance of the point from a boundary of the range of action and/or of a time elapsed since the triggering of the corresponding restraint system. Such adaptations of operating parameters are especially advantageous if a plurality of restraint systems are assigned to a direction, thus, for example, a front airbag and a seat-belt tensioners are used, which complement each other, thereby allowing a "softer" setting of one or both restraint systems, which, where appropriate, can also prove advantageous to the occupants. Therefore, as previously mentioned, an adaptivity control is preferably activated if an adaptive restraint system, in which operating parameters are adaptive, was triggered beforehand. While various options for concrete adaptation of the operating parameter are conceivable, it is nevertheless especially advantageous if the adaptation is even done as a function of the motion values, wherein it can be provided, for example, to determine the speed of the occupants relative to the vehicle body from the motion values, wherein a consideration can be carried out for a predetermined evaluation period. In this case, a quantity derived from the motion values is therefore used. It should be pointed out that if the motion values do not specify any points within a range of action for the adaptation of an operating parameter, thus, no adaptation threshold is exceeded, a setting of the restraint is selected that is as severe as possible, and, therefore, safe and is only changed if the adaptation threshold should nevertheless be exceeded.

A preferred refinement of the present invention provides that, at least in the case of actions related to the triggering of restraint systems, a directional algorithm restricted to sensor data and restraint systems assigned only to one direction is carried out in parallel, a trigger signal based on both the motion values and the directional algorithm being sufficient for triggering the restraint system. Therefore, it is proposed to use the "multi-directional" algorithm proposed as the core of the present invention in addition to already known directional algorithms related to a single direction as are already known in the art. The triggering decision of the multi-directional algorithm is implemented on an equal footing with the directional algorithm, which means the decision for triggering a restraint system can be made independent of both instances. In this way, the already existing performance of the directional algorithms known from the prior art that is optimized for collisions in one direction is preserved and supplemented with a specific consideration of collisions that can no longer be uniquely assigned to the longitudinal direction or the transverse direction. The directional algorithms therefore relate in particular to the longitudinal direction (head-on collision algorithm and rear-end collision algorithm) and to the transverse direction (side collision algorithm).

In this context, it is especially advantageous if actions related to the adaptation of at least one operating parameter are controlled exclusively on the basis of motion values. It has been shown that in this regard that, if the restraint system is first triggered, ultimately the same mode of function would result, so that the adaptivity control can be realized centrally in the multi-directional algorithm, which determines and evaluates the motion values. In this way, the directional algorithms can be realized in a simplified way. Thus, it may be expedient if a communications channel exists between the multi-directional algorithm and the directional algorithm, or the fact that a restraint system was triggered can otherwise be made known to the multi-directional algorithm determining and evaluating the motion values by, for example, the setting of a flag. As was already presented, an operating parameter relating to the severity of the restraint intervention of the restraint system can in particular be adapted as operating parameter. In the case of airbags, the operating parameter can be, for example, the degree of opening of an airbag valve; in the case of seat-belt tensioners, for example, a belt force limit.

As was already presented and which is ultimately the basis of the aforementioned directional algorithms, restraint systems usually relate in any case to the longitudinal direction and the transverse direction of the motor vehicle, as is clearly evident in the example of front airbags, head airbag, side airbag, seat-belt tensioners and the like. Accordingly, it is also provided within the context of the present invention that restraint systems that relate to the longitudinal direction and the transverse direction are used, which means the restraint systems produce their effect at least essentially in the longitudinal direction or the transverse direction.

In addition to the method, the invention also relates to a motor vehicle having a safety system with a control unit designed to carry out the method according to the invention. All designs related to the method according to the invention can be analogously transferred to the motor vehicle according to the invention, with which the aforementioned advantages can likewise be attained.

Figure 2:
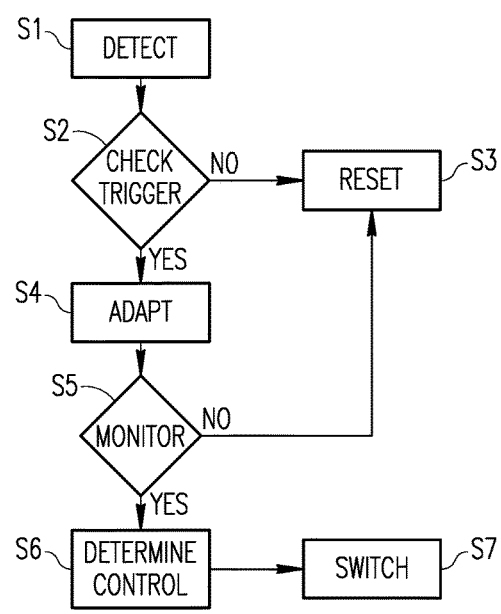
Figure 3:
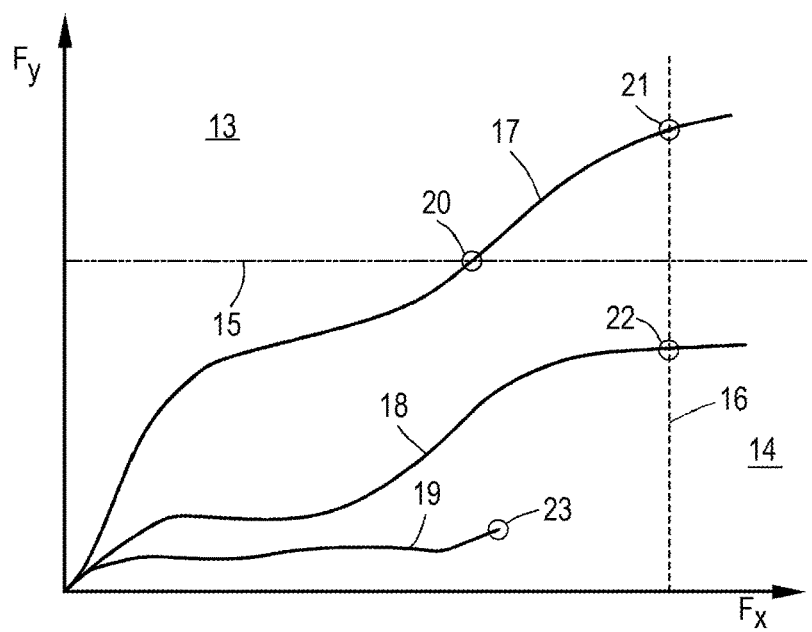
Figure 4:
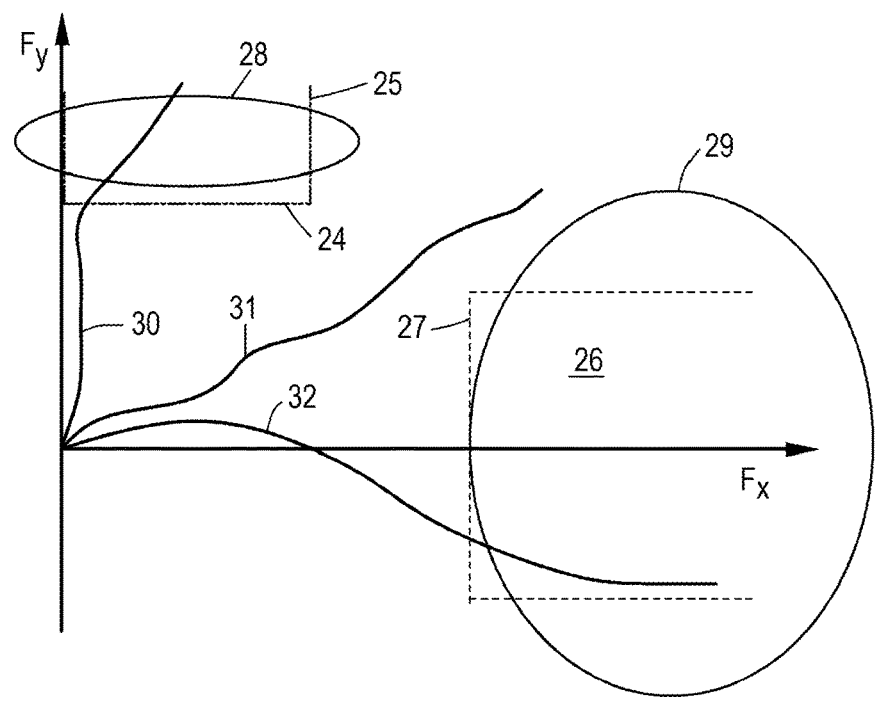
Figure 5:
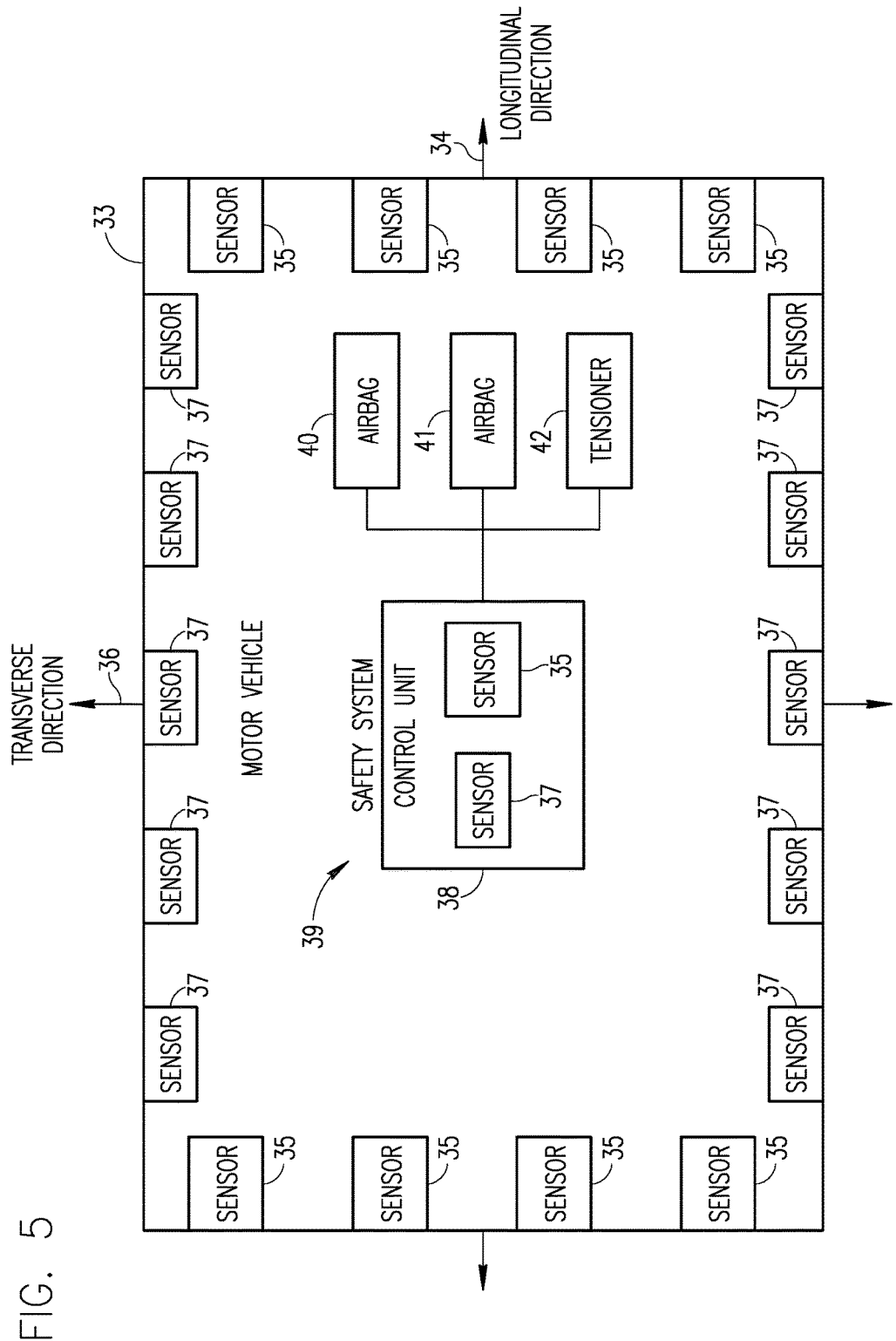

Additional advantages and individual details of the present invention result from the exemplary embodiments described in the following as well as the drawing. The following is shown:

FIG. 1 the algorithm structure for the operation of a safety system in an exemplary embodiment of the invention, FIG. 2 a flow chart of an exemplary embodiment of the method according to the invention, FIG. 3 collision curves in the decision space for explanation of the triggering of restraint systems, FIG. 4 collision curves in the decision space for the explanation of the adaptivity of restraint systems, and FIG. 5 a motor vehicle according to the invention.

Explained in detail below is an exemplary embodiment of the method according to the invention that is used for the operation of a safety system, specifically for controlling the operation of restraint systems in the event of a collision. Collisions are usually detected in modern motor vehicles by collision sensors that measure the acceleration of the motor vehicle within a specific range in longitudinal and transverse direction, a distinction frequently being made between front-end collisions, rear-end collisions and side collisions. The motor vehicle discussed here has front airbags, side airbags and seat-belt tensioners as restraint systems. Of course, other restraint systems may also be provided.

As is evident from the schematic diagram of FIG. 1, not just a single algorithm is used in this case to control restraint systems 1, 2, 3, which in the present case are divided into restraint systems 1 for front impact, restraint systems 2 for side impact and restraint systems 3 for rear-end impact. Sub-boxes 4, 5 in this case symbolize, respectively, the triggering of restraint systems 1, 2, 3 and the adaptation of operating parameters of restraint systems 1, 2, 3. It should be pointed out that, of course, at least in the case of rear-end collisions and front-end collisions, the same restraint systems can generally be used at least some of the time; frequently, restraint systems that are assigned to a collision type are also simultaneously triggered, for example, the seat-belt tensioner and the front airbag simultaneously in the event of a front-end collision.

Each of these collision directions or collision types, that is, front-end collision, side collision and rear-end collision, is then always first assigned a directional algorithm 6, 7, 8, specifically here: a front-end collision algorithm 6, a side collision algorithm 7 and a rear-end collision algorithm 8. Such directional algorithms 6, 7, 8 developed for specific directions of the collision are already fundamentally known in the art but in the present case, as symbolized by sub-box 9, are only used with regard to the triggering decision.

This is because parallel to directional algorithms 6, 7, 8 (or a directional algorithm 6, 7, 8 selected according to specific criteria by evaluation of the sensor data of the collision sensors) a multi-directional algorithm 12 also runs in the control unit of the safety system. This can just as well also arrange a triggering of restraint systems 1, 2, 3 with directional algorithms 6, 7, 8, as is symbolized by the "or" links 10; however, in the present exemplary embodiment it also completely takes over the adaptivity control, as is symbolized by sub-box 11. This means that the adaptation of restraint systems 1, 2, 3 is centrally controlled by the multi-directional algorithm 12.

FIG. 2 shows somewhat more precisely the diagrammed flow structure of the exemplary embodiment of the method according to the present invention. In this regard, a collision is detected in a step S1. This results in a step S2 check of whether a restraint system is to be triggered at least via multi-directional algorithm 12, but also by at least one of directional algorithms 6, 7, 8 if corresponding criteria are met.

For this purpose an evaluation of the sensor data of the collision sensors (ideally all collision sensors) is carried out by multi-directional algorithm 12 in order to determine motion values describing the movement of the occupants. In order for this to succeed, a transfer function is used that comprises a two-fold integration of the sensor data describing the acceleration in longitudinal and transverse directions and a filtering with respect to restrictions of the occupant movement by, for example, the belt and the seats. Any parameters of the transfer function that are needed at the time may be determined here as a whole in simulations and/or test measurements. The result is two motion values, specifically one that relates to the longitudinal direction of the motor vehicle (x) and one that relates to the transverse direction of the motor vehicle (y). The current motion values therefore define a point in a two-dimensional decision space, a check being made in step S2 of whether these points are within ranges of action defined in the decision space, thus, a trigger threshold forming the boundary of the range of action is exceeded within the temporal progression.

This is explained in detail in reference to the graph of FIG. 3, which shows the decision space spanned by the possible values for the motion values (axes $F_x$ and $F_y$). Two boundaries of ranges of action 13, 14 are shown there as trigger thresholds, which are designated in the present case as trigger lines 15, 16. Trigger lines 15, 16 are illustrated in the present simplified exemplary embodiment as straight lines, but do not necessarily have to have a straight course.

Furthermore, FIG. 3 shows three possible collision curves 17, 18, 19, which result from the time sequence of the points defined by the motion values. A first collision 17 is obviously rather intense and quickly results in extensive movements of the occupants. In a point 20, trigger line 15 is first exceeded, so that collision curve 17 continues to run within range of action 13, which is assigned to the triggering of the side airbag. Consequently, the automatic triggering of the side airbag occurs at the instant in which collision curve 17 reaches point 20. However, in the further course of the crash trigger line 16, point 21, is also exceeded, so that the collision curve is also within range of action 14, so that the front airbag is also triggered at the appropriate instant. The collision curve 17 therefore clearly corresponds to a collision that cannot be uniquely assigned to the longitudinal direction or the transverse direction of the motor vehicle.

The crash curve 18 obviously runs less intensely in the transverse direction of the motor vehicle and at point 22 crosses just trigger line 16 for range of action 14, so that the front airbag (and where applicable also the seat-belt tensioner) is triggered. It should be pointed out that, of course, different trigger thresholds or ranges of action for the front airbag and the seat-belt tensioner may also be provided.

Third collision curve 19 describes a less intense collision, which is seen as concluded at point 23, without a trigger threshold 15, 16 being reached.

Referring back to FIG. 2, this means that if in step S2 no restraint systems 1, 2, 3 were triggered after the detected conclusion of the collision, according to step S3 the algorithms used are reset until another collision occurs. However, if restraint systems 1, 2, 3 have been triggered, the process continues in step S4, and the adaptivity control is activated. Thus, in step S5, as presently illustrated, there is only monitoring via multi-directional algorithm 12 in reference to the motion values as to whether ranges of action are reached in the decision space that are for the adaptation of operating parameters of at least one restraint system 1, 2, 3. In other words, the motion values that were tracked already in step S2 are also still tracked in step S5, which is explained in detail by FIG. 4, which in turn shows the decision space with the axes $F_x$ and $F_y$. A range of action 24 assigned to the adaptation of operating parameters of the side airbag is delimited by adaptation threshold 25; a range of action 26 assigned to an adaptation of the operating parameters of the seat-belt tensioner is limited by an adaptivity threshold 27. Ellipses 28 and 29 symbolize the areas of influence of, respectively, the side airbag and the front air bag.

Again, three collision curves 30, 31 and 32 are additionally shown, collision curve 30 penetrating into range of action 24 for the adaptation of an operating parameter of the side airbag, collision 32 into range of action 26 for adaptation of an operating parameter of the seat-belt tensioner. Crash curve 31 does not touch any of these ranges of action, so that in this case the maximum intensity restraint action of the side airbag and the seat-belt tensioner is conserved.

If in the case of collision curve 31 no adaptation threshold 20, 27 is exceeded and if the collision is concluded at a later instant, step S3 is continued from step S5. However, if an adaptation of an operating parameter is required, the type of control is determined in step S6. With use of the motion values, the speed of the occupant movement relative to the vehicle body is determined here on the basis of appropriate evaluation time frames, and from it are accordingly derived the adapted operating parameters. If this evaluation time frame is concluded and the operating parameters are present, the actual control of corresponding restraint systems 1, 2, 3 with the new operating parameters, in particular that is a soft-switching of at least one restraint system 1, 2, 3, occurs in a step S7.

Finally, FIG. 5 shows a schematic diagram of a motor vehicle 33 according to the invention. It has collision sensors 35 assigned to its front and at its rear—with respect to vehicle longitudinal direction 34—that measure in particular the acceleration in the vehicle longitudinal direction and collision sensors 37—assigned to both sides of transverse direction 36—that pick up in particular the acceleration in transverse direction 36. The sensor data of collision sensors 35, 37 are evaluated in a control unit 38 of a safety system 39 of motor vehicle 33 that is designed to carry out the method according to the present invention and as such is connected not only to collision sensors 35, 37, but also to different restraint systems 1, 2, 3, in this case a front airbag 40, a side airbag 41 and a seat-belt tensioner 42 for each of the respective different occupants. Of course, collision sensors 35, 37 for longitudinal direction 34 and transverse direction 36, whose sensor data are included in the consideration, may also be provided within control unit 38 itself.

The invention claimed is:

1. A method of operating a safety system of a motor vehicle in the event of a collision with a collision object, the safety system including a longitudinal restraint system and a transverse restraint system, the method comprising:
    using a plurality of collision sensors to record acceleration of the motor vehicle in sensor data, the sensor data describing directions of the acceleration within a horizontal plane;
    determining a first motion value that describes motion of at least one occupant of the motor vehicle along a longitudinal direction of the motor vehicle based on the sensor data;
    determining a second motion value that describes motion of the at least one occupant of the motor vehicle along a transverse direction of the motor vehicle based on the sensor data;
    determining that a first action threshold has been exceeded based on the first and second motion values;
    triggering the longitudinal restraint system and/or the transverse restraint system based on the first action threshold being exceeded;
    determining that a second action threshold has been exceeded based on the first and second motion values; and
    updating an operating parameter relating to a severity of action of the longitudinal restraint system and/or the transverse restraint system based on the second action threshold being exceeded.

2. The method according to claim 1 wherein determining the first motion value based on the sensor data includes performing a dual integration of the sensor data to obtain the first motion value and determining the second motion value based on the sensor data includes performing a dual integration of the sensor data to obtain the second motion value.

3. The method according to claim 2 wherein a time window for the dual integrations is within a range from 10 to 100 ms and/or is determined as a function of an operating state of at least one of the longitudinal and/or transverse restraint systems.

4. The method according to claim 1 wherein the determining the first motion value is based on at least one filter and/or factor describing an effect of objects changing and/or limiting movement of the at least one occupant.

5. The method according to claim 4 wherein filter parameters of the filter and/or the factor are determined based on results of simulations and/or test measurements.

6. The method according to claim 1 wherein updating the operating parameter includes changing the operating parameter by an amount determined as a function of a degree to which the second action threshold is exceeded.

7. The method according to claim 1 wherein a directional algorithm restricted to sensor data associated with only one of the longitudinal and transverse directions is carried out in parallel with the determining of the first and second motion values, and a trigger signal based on both the first and second motion values and the directional algorithm is sufficient to trigger the longitudinal restraint system or the transverse restraint system.

8. The method according to claim 7 wherein updating the operating parameter relating to the severity of action of the longitudinal restraint system and/or the transverse restraint system is based exclusively on the first and second motion values.

9. The method according to claim 1 wherein the operating parameter is an operating parameter of a belt force limiter.

10. The method according to claim 9 wherein the operating parameter is a belt force limit of the belt force limiter.

11. The method according to claim 1 wherein the operating parameter is an operating parameter of an airbag valve.

12. The method according to claim 11 wherein the operating parameter is a degree of opening of the airbag valve.

13. The method according to claim 1 wherein updating the operating parameter includes changing the operating parameter by an amount determined as a function of a time elapsed since the triggering of the longitudinal restraint system and/or the transverse restraint system.

* * * * *